United States Patent
Fujita (10) Patent No.: US 9,269,475 B2
(45) Date of Patent: Feb. 23, 2016

(54) GAS-INSULATED BUS BAR (75) Inventor: Daisuke Fujita, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 254 days.

(21) Appl. No.: 13/879,525

(22) PCT Filed: Nov. 15, 2010

(86) PCT No.: PCT/JP2010/070299
§ 371 (c)(1),
(2), (4) Date: Apr. 15, 2013

(87) PCT Pub. No.: WO2012/066614
PCT Pub. Date: May 24, 2012

(65) Prior Publication Data
US 2013/0192864 A1 Aug. 1, 2013

(51) Int. Cl.
*H01B 7/40* (2006.01)
*H02G 5/06* (2006.01)
*H02G 5/00* (2006.01)

(52) U.S. Cl.
CPC ............ *H01B 7/40* (2013.01); *H02G 5/002* (2013.01); *H02G 5/068* (2013.01)

(58) Field of Classification Search
CPC ....... H02G 5/068; H02G 5/002; H02G 5/066; H02G 5/00; H02G 5/063; H01B 7/40; H01B 17/36
USPC .......................................................... 174/24
See application file for complete search history.

(56) References Cited

U.S. PATENT DOCUMENTS

| 3,610,807 | A | * | 10/1971 | Whitehead | ............... | H01B 9/06 |
| | | | | | | 174/13 |
| 3,809,801 | A | * | 5/1974 | Niemoller | .............. | H02G 5/066 |
| | | | | | | 174/171 |
| 3,911,198 | A | * | 10/1975 | Picard et al. | ..................... | 174/28 |
| 4,556,755 | A | | 12/1985 | Bolin et al. | | |
| 5,089,665 | A | * | 2/1992 | Thuries | .................. | H02G 5/068 |
| | | | | | | 174/14 R |

(Continued)

FOREIGN PATENT DOCUMENTS

JP SHO57-7828 U 1/1982
JP SHO59-159128 U 10/1984

(Continued)

OTHER PUBLICATIONS

International Search Report (PCT/ISA/210) issued on Dec. 14, 2010, by the Japanese Patent Office as the International Searching Authority for International Application No. PCT/JP2010/070299.

(Continued)

*Primary Examiner* — Adrian S Wilson
*Assistant Examiner* — Izak Baranowski
(74) *Attorney, Agent, or Firm* — Buchanan Ingersoll & Rooney PC (57) ABSTRACT

A gas-insulated bus bar includes a metal container, a main circuit conductor that is accommodated in the metal container, an insulation spacer of a one-legged structure that includes one end portion attached to the metal container and the other end portion holding the main circuit conductor in the metal container, a shield that is substantially barrel-shaped, attached to the other end portion, and having an outer diameter larger than an outer diameter of the main circuit conductor, and a branch pipe provided on a side of the metal container and branched in a direction substantially perpendicular to an axis line, thereby including an inside portion where the one end portion is arranged. When viewing from a direction parallel to a branching direction of the branch pipe, the insulation spacer and the shield have respective sizes that are arranged within an area defined by an inner diameter of the branch pipe.

18 Claims, 7 Drawing Sheets

PORTION A

(56) References Cited

U.S. PATENT DOCUMENTS

| | | | | |
|---|---|---|---|---|
| 6,118,068 A * | 9/2000 | Kelch et al. | | 174/28 |
| 7,612,293 B2 * | 11/2009 | Arcand | | H02G 5/066 |
| | | | | 174/138 F |
| 2009/0266796 A1 * | 10/2009 | Kisanuki | | H02G 5/068 |
| | | | | 218/155 |
| 2010/0246085 A1 * | 9/2010 | Holaus et al. | | 361/111 |
| 2012/0103645 A1 | 5/2012 | Shimizu et al. | | |

FOREIGN PATENT DOCUMENTS

| | | | |
|---|---|---|---|
| JP | S61-244214 A | 10/1986 | |
| JP | SHO63-149132 U | 9/1988 | |
| JP | 5-091630 A | 4/1993 | |
| JP | 9-294324 A | 11/1997 | |
| JP | 11-098661 A | 4/1999 | |
| JP | 2002-209326 A | 7/2002 | |
| JP | 4436896 B1 | 3/2010 | |

OTHER PUBLICATIONS

Written Opinion (PCT/ISA/237) issued on Dec. 14, 2010, by the Japanese Patent Office as the International Searching Authority for International Application No. PCT/JP2010/070299 and English language translation (7 pages).

* cited by examiner

FIG.2

PORTION A

GAS-INSULATED BUS BAR

FIELD

The present invention relates to a gas-insulated bus bar that includes a main circuit conductor arranged in a metal container charged with insulation gas and an insulation spacer that supports the main circuit conductor such that the main circuit conductor is insulated from the metal container.

BACKGROUND

A gas-insulated bus bar used in an electric power plant or an electrical substation is configured by arranging a main circuit conductor in a metal container charged with insulation gas and supporting the main circuit conductor with an insulating member such that the main circuit conductor is insulated from the metal container.

Patent Literature 1 describes a gas-insulated bus bar including a cylindrical shield that covers end portions of main circuit conductors facing each other and a conical insulating support member that supports the shield in a metal container.

CITATION LIST

Patent Literature

Patent Literature 1: Japanese Patent Application Laid-open No. 61-244214

SUMMARY

Technical Problem

However, in the gas-insulated bus bar described in Patent Literature 1, the conical insulating support member needs to be mounted, to which the shield is attached, which causes a troublesome task in assembling the bus bar, and an electric field is likely to be concentrated on an end portion of the shield.

The present invention has been achieved in view of the above problems, and an object of the present invention is to provide a gas-insulated bus bar that can mitigate an electric field concentrated on end portions of a main circuit conductor and a shield and can achieve improvements of assembling workability and simplification of the configuration of the gas-insulated bus bar.

Solution to Problem

In order to solve above-mentioned problems and achieve the object, a gas-insulated bus bar according to the present invention includes a cylindrical metal container that is arranged with insulation gas filled therein; a main circuit conductor that is accommodated in the metal container, extended in parallel to an axis line of a main body of the metal container, and has a cross section with a circular outer shape; an insulation spacer of a one-legged structure that is arranged in the metal container in a direction of the axis line of the main cylindrical body at a predetermined interval and includes one end portion attached to the metal container and the other end portion holding the main circuit conductor in the metal container while electrically insulating the main circuit conductor from the metal container, thereby supporting the main circuit conductor in the metal container such that the main circuit conductor is insulated from the metal container; a shield that is substantially barrel-shaped and made of metal, attached to the other end portion of the insulation spacer, has an outer diameter larger than an outer diameter of the main circuit conductor and includes an inside portion into which the main circuit conductor is inserted, and holds the main circuit conductor in the metal container; and a branch pipe that is provided on a side of the metal container, arranged in the direction of the axis line at the predetermined interval corresponding to a place where the insulation spacer is arranged, and branched in a direction substantially perpendicular to the axis line, thereby including an inside portion where the one end portion of the insulation spacer is arranged, wherein with a planar view from a direction parallel to a branching direction of the branch pipe, the insulation spacer and the shield have such respective sizes that are arranged within an area defined by an inner diameter of the branch pipe.

Advantageous Effects of Invention

According to the present invention, it is possible to mitigate an electric filed concentrated on end portions of a shield and a main circuit conductor, and it is also possible to mitigate an electric field around a center portion of the shield.

Furthermore, according to the present invention, because an insulation spacer and the shield can be installed in a metal container by assembling the insulation spacer and the shield outside the metal container and passing the assembled insulation spacer and shield through a branch pipe, the assembling workability is improved.

Further, according to the present invention, because an insulation spacer of a one-legged structure and a shield having a barrel shape are used, the configuration of the gas-insulated bus bar is simplified.

DESCRIPTION OF EMBODIMENTS

Exemplary embodiments of a gas-insulated bus bar according to the present invention will be explained below in detail with reference to the accompanying drawings. The present invention is not limited to the embodiments.

First Embodiment

Figure 1:
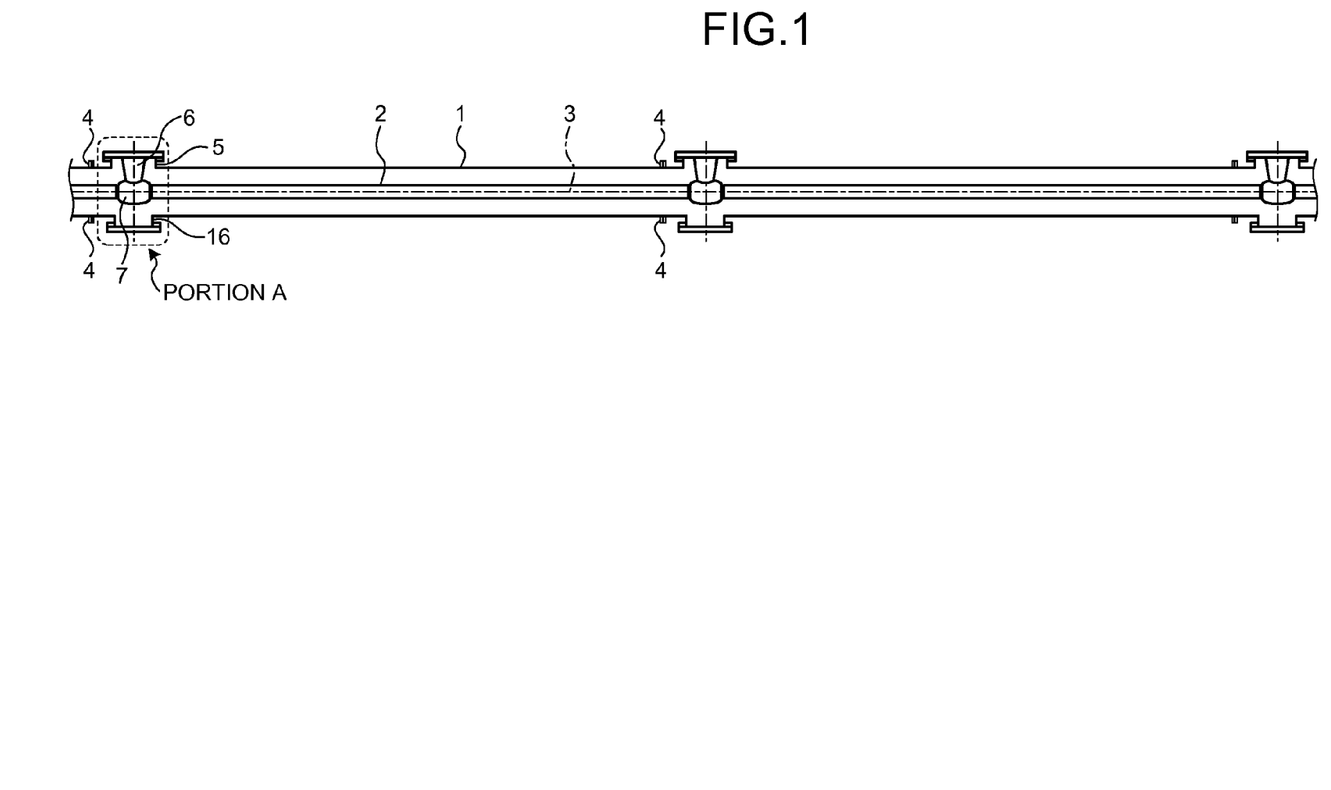
FIG. 1 is a longitudinal cross-sectional diagram of a gas-insulated bus bar according to a first embodiment.
Figure 2:
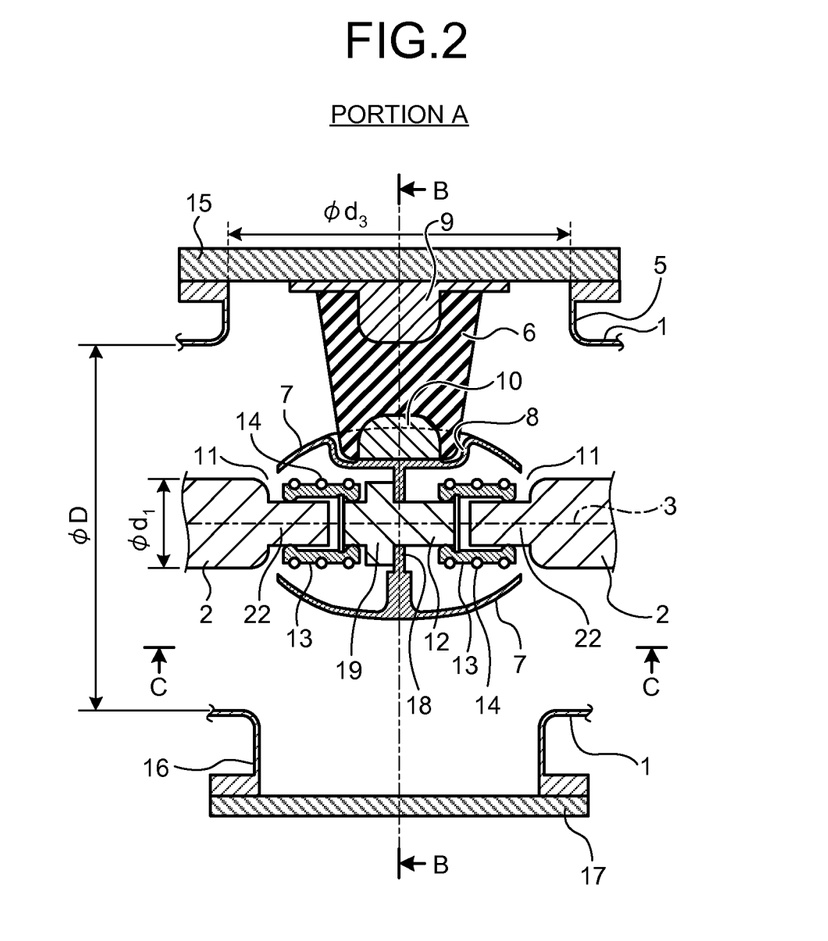
FIG. 2 is a detailed diagram of a portion A shown in FIG. 1.
Figure 3:
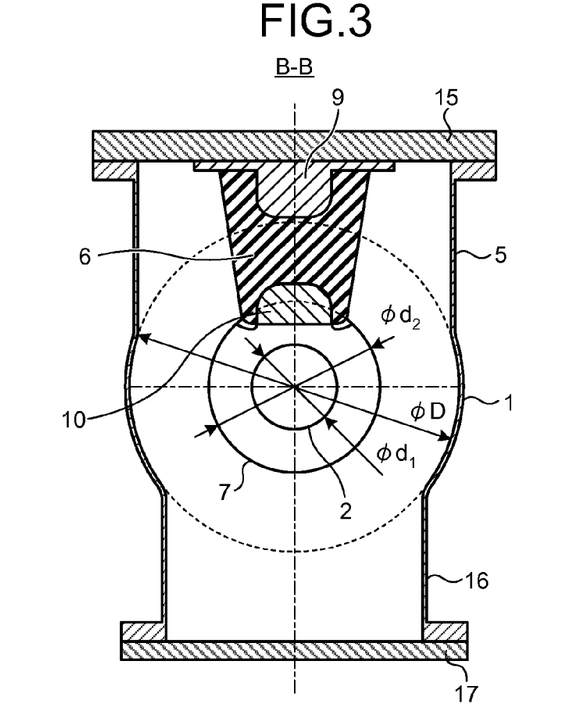
FIG. 3 is a cross-sectional diagram along a line B-B shown in FIG. 2.
Figure 4:
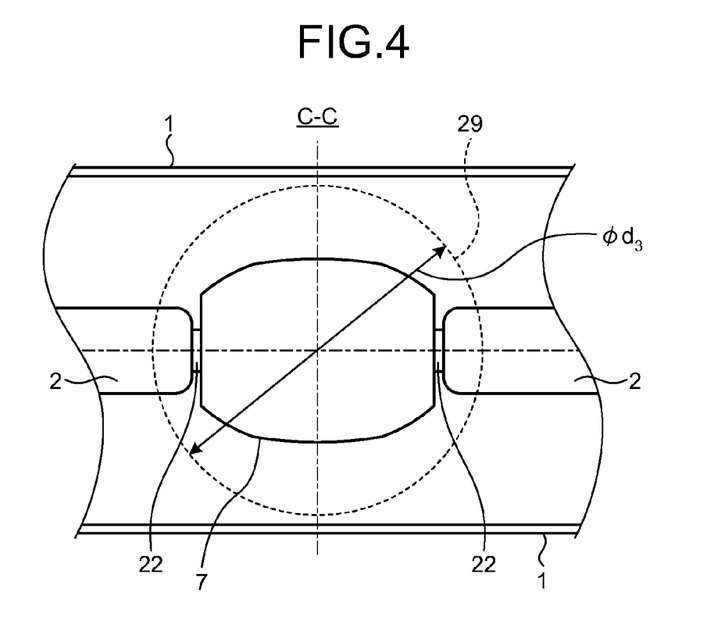
FIG. 4 is a diagram as viewed from a direction of arrows C-C shown in FIG. 2.

FIG. 1 is a longitudinal cross-sectional diagram of a gas-insulated bus bar according to a first embodiment of the present invention, FIG. 2 is a detailed diagram of a portion A shown in FIG. 1, FIG. 3 is a cross-sectional diagram along a line B-B shown in FIG. 2, and FIG. 4 is a diagram as viewed from a direction of arrows C-C shown in FIG. 2.

As shown in FIGS. 1 to 4, in the gas-insulated bus bar according to the present embodiment, a main circuit conductor 2 is accommodated in a cylindrical metal container 1 filled with insulation gas such as sulfur hexafluoride ($SF_6$). The metal container 1 is arranged with its longitudinal direction, for example, parallel to the horizontal direction. The metal container 1 can be also arranged vertically or with an inclination. An axis line 3 is a center axis of a main cylindrical body of the metal container 1. The main circuit conductor 2 is arranged to extend in parallel to the axis line 3, such that, for example, an axis line of the main circuit conductor 2 matches the axis line 3. The main circuit conductor 2 is a current conducting portion to which a voltage is applied and through which a current flows. The main circuit conductor 2 has a cross section of, for example, an annular shape of which an outer shape of the cross section is a circular shape. The main circuit conductor 2 represents one phase among three phases, and the other two phases have the same configuration.

The metal container 1 is configured by, for example, using a cylindrical member with flanges 4 formed on both end sides and connecting a plurality of cylindrical members in a direction of the axis line 3 by fastening the cylindrical members with the flange 4. Instead of forming the flange 4, the cylindrical members can be connected to each other by welding the main cylindrical bodies of adjacent metal containers 1. The metal container 1 includes, for example, a branch pipe 5 branched in an upward direction and, for example, a branch pipe 16 branched in a downward direction provided on a side of the metal container 1. The branch pipe 5 is arranged, for example, at a predetermined interval in the direction of the axis line 3, and the branch pipe 16 is arranged, for example, at a predetermined interval in the direction of the axis line 3 similarly to the branch pipe 5. The branch pipe 5 is, for example, a cylindrical branch that is branched, for example, in a direction substantially perpendicular to the direction of the axis line 3. Similarly, the branch pipe 16 is, for example, a cylindrical branch that is branched, for example, in a direction substantially perpendicular to the direction of the axis line 3. In the example shown in the drawings, the branch pipe 16 is arranged below the branch pipe 5, and an axis line of the branch pipe 5 and an axis line of the branch pipe 16 match each other, for example.

An inner diameter of the branch pipe 5 can be set, for example, equal to or smaller than an inner diameter of the main cylindrical body of the metal container 1. The length of the branch pipe 5 is shorter than the length of the metal container 1. Therefore, when forming the branch pipe 5 on the metal container 1, a case where the inner diameter of the branch pipe 5 is equal to or smaller than the inner diameter of the main cylindrical body of the metal container 1 is easier to produce the metal container 1 than otherwise. When the inner diameter of the branch pipe 5 is larger than the inner diameter of the main cylindrical body of the metal container 1, the metal container 1 is divided, and a dedicated container is produced and arranged only for a portion surrounding an insulation spacer 6, thereby causing an increase of the manufacturing cost of the metal container 1. Similarly, an inner diameter of the branch pipe 16 can be set equal to or smaller than the inner diameter of the main cylindrical body of the metal container 1.

A lid 15 is attached to the branch pipe 5 by a bolt, for example. The lid 15 seals the metal container 1, and the insulation spacer 6 is attached to the lid 15. The insulation spacer 6 has a one-legged structure, for example. The insulation spacer 6 is formed in a columnar shape, for example, and a cross-sectional shape on a plane perpendicular to its longitudinal direction is a circular shape, for example. An embedded electrode 9, which is a metal-container-side embedded electrode, is embedded in a one end portion of the insulation spacer 6, and the embedded electrode 9 is fixed to the lid 15 by a bolt, for example. That is, the one end portion of the insulation spacer 6 is attached to the lid 15, which is a portion of the metal container 1, via the embedded electrode 9. Therefore, the one end portion of the insulation spacer 6 is arranged in the branch pipe 5.

It is preferred that at least a portion of the embedded electrode 9 is located outside an area defined by the inner diameter of the main cylindrical body of the metal container 1 centering around the axis line 3. With this configuration, an electric field around the embedded electrode 9 is mitigated. The electric field mentioned here is an electric field generated inside the metal container 1 when the current flows through the main circuit conductor 2. The whole embedded electrode 9 can be arranged outside the area defined by the inner diameter of the main cylindrical body of the metal container 1 centering around the axis line 3, and in this case, the electric field around the embedded electrode 9 is most mitigated.

An embedded electrode 10, which is a shield-side embedded electrode, is embedded in the other end portion of the insulation spacer 6. Furthermore, a shield 7, which is substantially barrel-shaped and made of metal, is attached to the other end portion of the insulation spacer 6 via the embedded electrode 10. Specifically, the shield 7 is fixed to the embedded electrode 10 by a bolt, for example. The shield 7 has a hollow structure through which the current conducting portion of the main circuit penetrates in the direction of the axis line 3, includes an opening portion 11 on each of both ends in the direction of the axis line 3, and covers connection parts of the main circuit conductors 2. A diameter of the opening portion 11 of the shield 7 is larger than, for example, an outer diameter $\phi d_1$ of the main circuit conductor 2. Furthermore, an outer diameter of the shield 7 is larger than the outer diameter $\phi d_1$ of the main circuit conductor 2 at any position in the direction of the axis line 3. Generally, the electric fields of the end portions of the shield 7 and the main circuit conductor 2 are likely to be increased. However, the concentration of the electric field near the end portions can be mitigated by forming the shield 7 in a substantially barrel shape and setting the outer diameter of the shield 7 larger than the outer diameter $\phi d_1$ of the main circuit conductor 2 such that an equipotential line is pushed out to the outer side. Furthermore, by forming the shield 7 in a substantially barrel shape, a curvature radius of its center portion is increased, where by the electric field surrounding the center portion is also mitigated.

Further, for example, an annular portion 18 of an annular plate shape is provided at a substantially center portion of the shield 7 in the direction of the axis line 3 along an inner circumference of the shield 7. The annular portion 18 is connected to an inner surface of a main body of the shield 7 having an outer circumference defining the substantially barrel-shaped outer shape, and is arranged with a center axis matched with, for example, the axis line 3. An adaptor conductor 12, which is formed, for example, in a substantially columnar shape, is inserted through the annular portion 18, with an axis line parallel to the axis line 3. The adaptor conductor 12 is fixed and supported by the annular portion 18 via a flange portion 19 that is a portion of the adaptor conductor 12. The flange portion 19 is arranged on a surface on one side of the annular portion 18 in the direction of the axis line 3 (for example, on the left surface), and the flange portion 19 and the annular portion 18 are fastened by a bolt, for example. As described later, the adaptor conductor 12 is used to connect the end portions of the main circuit conductors 2.

Furthermore, a concave portion 8 is formed on a portion of an outer surface of the shield 7 on a side of the branch pipe 5. The other end portion of the insulation spacer 6 is arranged in the concave portion 8, so that the insulation spacer 6 is arranged to be surrounded by the shield 7. Therefore, at least a portion of the embedded electrode 10 is arranged in the concave portion 8. By arranging at least a portion of the embedded electrode 10 in the concave portion 8 that is an inner side than the outer shape of the barrel shape, the electric field around the embedded electrode 10 can be mitigated. Furthermore, the whole embedded electrode 10 can be also arranged in the concave portion 8, and in this case, the electric field around the embedded electrode 10 is most mitigated.

The main circuit conductor 2 is configured by connecting, for example, a plurality of tubular conductors of a predetermined length in the direction of the axis line 3. A connection part of the main circuit conductors 2 is, for example, a place where the insulation spacer 6 is arranged, and in the shield 7, end portions 22 of the main circuit conductors 2 to be connected to each other are arranged so as to face each other. That is, the end portion 22 of the main circuit conductor on one side is inserted into the opening portion 11 of the shield 7 on the one side, and the end portion 22 of the main circuit conductor on the other side is inserted into the opening portion 11 of the shield 7 on the other side, the end portions 22 are arranged so as to face each other with a predetermined distance therebetween, and the adaptor conductor 12 is arranged between the end portions 22. An outer shape of a cross section of the end portion 22 is a circular shape, for example, and an outer diameter of the end portion 22 is, for example, smaller than the outer diameter $\phi d_1$ of the other portion of the main circuit conductor 2.

The end portion 22 of the main circuit conductor on the one side inserted into the opening portion 11 of the shield 7 on the one side is connected to a one end portion of the adaptor conductor 12 via a contact 13, and the end portion 22 of the main circuit conductor on the other side inserted into the opening portion 11 of the shield 7 on the other side is connected to the other end portion of the adaptor conductor 12 via another contact 13. The contact 13 is a contact including a contact point with the main circuit conductor 2 being slidable in the direction of the axis line 3, and is for example, a tulip-shaped contact. In the example shown in the drawings, the contact 13 is configured with a plurality of contact pieces arranged in a circumferential direction and bundled by a garter spring 14 from the outer side. The end portion 22 is pressed and inserted into the contact 13, and is electrically connected to the adaptor conductor 12. Therefore, the end portions 22 facing each other are electrically connected to each other via the contact 13 and the adaptor conductor 12, for example.

By connecting the end portions 22 of the main circuit conductors 2 to each other with the contact 13, an operation of connecting the main circuit conductors 2 can be performed with ease. Furthermore, by using a contact with a contact point thereof being slidable in the direction of the axis line 3 as the contact 13, even when, for example, the main circuit conductor 2 is subjected to thermal expansion or contraction in the direction of the axis line 3, the end portion 22 that is in contact with the contact 13 is moved according to the expansion or contraction of the main circuit conductor 2, by which the expansion or contraction is absorbed, so that no excessive stress due to the expansion or contraction is applied to the connection part. Furthermore, although the contact 13 becomes a heat source when the current flows, because the contact 13 is arranged inside the shield 7 of a barrel shape, the large internal space and surface area of the shield 7 can improve the heat dissipation and reduce the thermal influence on the main circuit conductor 2 due to a temperature rise.

In this manner, the shield 7 holds the main circuit conductor 2 in the metal container 1 via the adaptor conductor 12 and the contact 13. Furthermore, the shield 7 covers the end portion 22 of the main circuit conductor 2. The adaptor conductor 12 can be integrated with the shield 7. The shield 7 is formed from aluminum, for example, and when the adaptor conductor 12 is integrated with the shield 7, the adaptor conductor 12 is also formed from aluminum, for example. However, if high conductivity is needed, it is preferred to produce the adaptor conductor 12 with material having higher conductivity, such as copper. In this case, by producing the adaptor conductor 12 and the shield 7 separately from each other, as shown in the drawings, it suffices that the shield 7 is formed by aluminum, for example, without changing the material, and the adaptor conductor 12 can be formed by copper, for example, which also leads to cost reduction. Furthermore, by using the adaptor conductor 12, the connection structure for connecting the contacts 13 is simplified.

The outer diameter of the end portion 22 is set smaller than the outer diameter $\phi d_1$ of the main circuit conductor 2. This is because, by securing a larger gap between the opening portion 11 of the shield 7 and the main circuit conductor 2, the heat generated from the contact 13 when the current flows can be transferred outside the shield 7 with ease, so that the heat dissipation can be further improved. Furthermore, the diameter of the opening portion 11 of the shield 7 is, for example, larger than the outer diameter $\phi d_1$ of the main circuit conductor 2, which also has the same effect.

In the present embodiment, with a planar view from a direction parallel to a branching direction of the branch pipe 5 (the axial direction of the branch pipe 5), the insulation spacer 6 and the shield 7 are arranged within a range of an area 29 defined by the inner diameter of the branch pipe 5. That is, when the inner diameter of the branch pipe 5 is $\phi d_3$, it is preferred that the insulation spacer 6 and the shield 7 in their entirety exist within, for example, the area 29 of a circular shape defined by the diameter $\phi d_3$ in the planar view mentioned above. With this configuration, the insulation spacer 6 and the shield 7 can be assembled outside the metal container 1 and then installed in the metal container 1 through the branch pipe 5, so that an assembling operation can be performed with ease. If the inner diameter of the branch pipe 5 is not constant with respect to the direction of the axis line of the branch pipe 5, for example, it suffices to configure that the insulation spacer 6 and the shield 7 exist in their entirety within an area defined by the smallest inner diameter.

Furthermore, it is preferred that 1/e (where e is the base of natural logarithm) times an inner diameter $\phi D$ of the main cylindrical body of the metal container 1 is larger than the outer diameter $\phi d_1$ of the main circuit conductor 2 and smaller than a maximum outer diameter $\phi d_2$ of the shield 7, that is, $$\phi d_1 < \phi D/e < \phi d_2 \tag{1}$$

The reason is as follows. When the main circuit conductor 2 and the metal container 1 are coaxial cylinders, a magnitude E of the electric field in a space between the main circuit conductor 2 and the metal container 1 is defined by $$E = V/(x/2 \cdot \ln(\phi D/2x)) \tag{2}$$

where V is potential of the main circuit conductor 2, and x is arbitrary distance in a radial direction from the axis line 3. From this equation, it is found that the minimum value of the electric field magnitude E is $2x = \phi D/e$. Therefore, if the outer diameter $\phi d_1$ of the main circuit conductor 2 and the maximum outer diameter $\phi d_2$ of the shield 7 are set to sandwich the diameter $\phi D/e$ at which the magnitude of the electric field is minimized, the electric field of the both sides can be reduced in a well balanced manner, and the maximum electric field can be reduced as the whole bus bar.

A lid 17 is attached to the branch pipe 16 by a bolt, for example. The lid 17 seals the metal container 1. When assembling the gas-insulated bus bar, it is possible to visually check an operation of connecting the main circuit conductors 2 from outside the metal container 1 through the branch pipe 16 in a state of opening the lid 17. It is preferred that the length of the shield 7 in the direction of the axis line 3 is shorter than an inner diameter of the branch pipe 16. This is because, with this configuration, the visibility is improved when connecting the main circuit conductors 2, so that the reliability of the assembling operation is further improved.

As described above, according to the present embodiment, by setting the outer diameter of the shield 7 larger than the outer diameter of the main circuit conductor 2, it is possible to relax the electric field concentrated on the end portions of the shield 7 and the main circuit conductor 2. Furthermore, according to the present embodiment, by forming the shield 7 in a substantially barrel shape, it is possible to mitigate the electric field concentrated on the end portions of the shield 7 and the main circuit conductor 2. Further, according to the present embodiment, because the curvature radius of the center portion of the shield 7 is increased due to the barrel shape, it is possible to mitigate the electric field around the center portion. Therefore, according to the present embodiment, it is possible to mitigate the overall electric field of the metal container 1 and to achieve downsizing of the gas-insulated bus bar.

According to the present embodiment, with a planar view from a direction parallel to the branching direction of the branch pipe 5 (the direction of the axis line of the branch pipe 5), the insulation spacer 6 and the shield 7 are arranged within a range of the area 29 defined by the inner diameter of the branch pipe 5, and therefore it is possible to assemble the insulation spacer 6 and the shield 7 outside the metal container 1 and then install the assembled insulation spacer and shield in the metal container 1 through the branch pipe 5, thereby improving the assembling performance. Furthermore, by assembling the insulation spacer 6 and the shield 7 outside the metal container 1, cleaning and checking operations after assembling the insulation spacer 6 and the shield 7 is easier than a case where the insulation spacer 6 and the shield 7 are assembled in the metal container 1, and there is a less possibility of affecting the insulation performance of the gas-insulated bus bar due to metal foreign matters introduced into the metal container 1.

According to the present embodiment, because the insulation spacer 6 of a one-legged structure is used, as compared to a spacer of a multiple-legged structure such as a two-legged or three-legged structure or a spacer of a conical shape, the structure of the insulation spacer 6 is simplified, thereby improving the assembling workability. Furthermore, by using the insulation spacer 6 of a one-legged structure, as compared to a case of using a multiple-legged structure, a surface area of the insulation spacer 6 is decreased, so that there is even less possibility of metal foreign matters being attached to the insulation spacer 6. Moreover, when the insulation spacer 6 of a one-legged structure is installed above the main circuit conductor 2, even if metal foreign matters behave at a bottom of the metal container 1 during operations, the possibility of the metal foreign matters being attached to the insulation spacer 6 is further reduced. In addition, by providing the branch pipe 16 below the insulation spacer 6, even if there is a behavior of metal foreign matters at a bottom of the metal container 1 during operations so that the metal foreign matters approach the insulation spacer 6, the metal foreign matters are dropped and captured in the branch pipe 16 and are not re-floated from the branch pipe 16 that is a low electric field portion, further reducing the possibility of the metal foreign matters being attached to the insulation spacer 6, which contributes to a considerable improvement of the reliability on the insulation performance.

According to the present embodiment, because the inner diameter of the branch pipe 5 is set equal to or smaller than the inner diameter of the main cylindrical body of the metal container 1, it is possible to reduce the manufacturing cost of the metal container 1.

According to the present embodiment, because at least a portion of the embedded electrode 10 on a side of the shield 7 is arranged in the concave portion 8, it is possible to mitigate the electric field that is likely to be concentrated around the embedded electrode 10. In this manner, by forming the concave portion 8 by using a bulged space at the center portion of the shield 7 of a barrel shape and arranging at least a portion of the embedded electrode 10 in the concave portion 8, it is possible to mitigate the electric field around the embedded electrode 10 and to reduce the diameter of the metal container 1. A configuration without forming the concave portion 8 in the shield 7 can also be used.

According to the present embodiment, because at least a portion of the embedded electrode 9 on a side of the metal container 1 is located outside an area defined by the inner diameter of the main cylindrical body of the metal container 1 centering around the axis line 3, the electric field around the embedded electrode 9 is mitigated. In this manner, it is possible to mitigate the electric field by arranging at least a portion of the embedded electrode 9 outside the area defined by the inner diameter of the main cylindrical body of the metal container 1 by using the internal space of the branch pipe 5, and therefore it does not necessitate an increase of the inner diameter of the main cylindrical body of the metal container 1.

According to the present embodiment, because the end portions 22 are electrically connected to each other via the contact 13 in the shield 7, the operation of connecting the main circuit conductors 2 is performed with ease. For example, in a method of fixing the end portion 22 and the adaptor conductor 12 with a bolt, a bolt fastening operation is needed in the metal container 1 with a large spatial restriction on the assembling operation. However, in the present embodiment, the connection is performed with ease by simply inserting the end portion 22 into the contact 13. Furthermore, by using a contact with a contact point thereof being slidable in the direction of the axis line 3 as the contact 13, it is possible to absorb, for example, the thermal expansion or contraction of the main circuit conductor 2 in the direction of the axis line 3 dimensionally.

According to the present embodiment, because the end portions 22 are connected to each other via the adaptor conductor 12, a connecting structure for connecting the contacts 13 to each other is simplified. In addition, by separating the adaptor conductor 12 from the shield 7, it is also suitable for a case where the adaptor conductor 12 and the shield 7 need to be produced by using different materials from each other.

Figure 5:
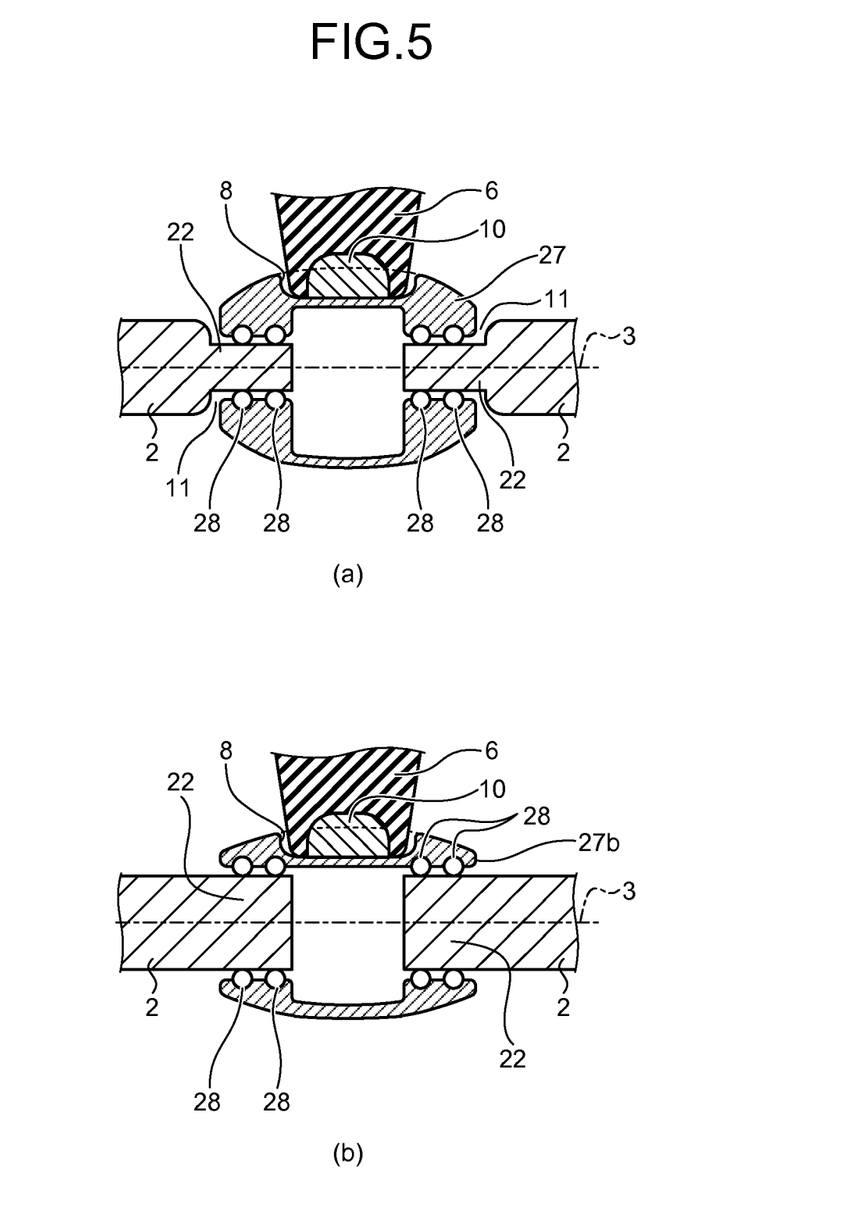
FIG. 5 depict another connection mode of connecting end portions of main circuit conductors to each other.

A configuration without using the adaptor conductor 12 for connecting the end portions 22 to each other can also be used. FIG. 5(a) depicts another connection mode of connecting the end portions 22 to each other. As shown in FIG. 5(a), a shield 27 is attached to the insulation spacer 6 via the embedded electrode 10. The shield 27 is the same as the shield 7 in that the outer shape is a barrel shape and the concave portion 8 is formed on a portion of the outer surface, but is different from the shield 7 in the internal shape. That is, the opening portion 11 at each of both ends of the shield 27 is a circular shape, and the inner diameter of the opening portion 11 is slightly larger than the outer diameter of the end portion 22 of the main circuit conductor 2. An annular-shaped groove is formed on an inner circumferential surface of each of both end portions of the shield 27, and for example, an annular-shaped coil spring contact 28 is arranged in each groove. In the example shown in the drawings, for example, two coil spring contacts 28 are provided on each of the end portions of the shield 27; However, one or three or more coil spring contacts can be provided. Furthermore, not only the coil spring contact 28, but also a band-shaped contact covering a whole circumference of the end portion 22 and having the same effect can be applied. Further, as shown in FIG. 5(b), the outer diameter of the end portion 22 can be set equal to the outer diameter of the main circuit conductor 2 and an inner diameter of the coil spring contact 28 can be increased. In this case, a shape of the end portion 22 of the main circuit conductor 2 can be simplified, and a thermal influence due to a temperature rise of the coil spring contact 28 can be reduced. The coil spring contact 28 is arranged in the groove of a shield 27b. The end portion 22 is inserted into the annular-shaped coil spring contact 28 to make contact with the coil spring contact 28, thereby being electrically connected to the shield 27. In this manner, the end portions 22 are electrically connected to each other via the shield 27 by respectively making contact with the coil spring contact 28. A contact point of the coil spring contact 28 and the end portion 22 is slidable in the direction of the axis line 3 similarly to as the contact 13 shown in FIG. 2.

According to the present embodiment, it suffices to use one shield 7 and one adaptor conductor 12 for connecting the end portions 22 to each other, and, as compared to a conventional configuration that requires two shields and two adaptor conductors, among which one shield and one adaptor conductor are arranged on each of both sides to sandwich a spacer of a conical shape, the number of parts is decreased and the dimension of the connection part in the direction of the axis line 3 is decreased, so that it is easy to achieve the above effect such that the assembling operation can be performed outside the metal container 1 by arranging the shield 7 in the range of the area 29 defined by the inner diameter of the branch pipe 5.

In the present embodiment, the diameter of the end portion 22 of the main circuit conductor 2 that is connected to the contact 13 is smaller than the outer diameter $\phi d_1$ of the main circuit conductor 2 of the other portion. With this configuration, the gap between the end portion of the shield 7 and the main circuit conductor 2 can be increased, and as a result, the heat generated by the contact 13 when the current flows can be dissipated outside the shield 7 effectively. Therefore, it is possible to prevent the conducting performance of the main circuit conductor 2 from being degraded.

In the present embodiment, the diameter of the opening portion 11 of the shield 7 is larger than the outer diameter of the main circuit conductor 2. With this configuration, the gap between the end portion of the shield 7 and the main circuit conductor 2 can be increased such that the same effect as the effect described above can be achieved, and even when a portion of the main circuit conductor 2 other than the end portion 22 approaches the opening portion 11 at assembly, or due to thermal expansion when the current flows, it is possible to prevent the main circuit conductor 2 and the shield 7 from making contact with each other so that a damage is caused, which contributes to improvement of the reliability.

According to the present embodiment, because the configuration satisfies, for example, the Equation (1) mentioned above, the electric field of the surface on the main circuit conductor 2 and the electric field on the surface of the shield 7 can be balanced (insulation coordination), so that the metal container 1 can be downsized by optimizing the diameter dimension of the metal container 1.

According to the present embodiment, because the insulation spacer 6 is configured to, for example, support the shield 7 from an upper portion of inner side of the metal container 1, metal foreign matters that behave in the metal container 1 under an operation voltage are hardly attached to the insulation spacer 6, which improves the reliability of the insulation performance. Furthermore, in this case, because the branch pipe 5 is also arranged on the upper portion of the metal container 1, the heat from the main circuit conductor 2 and the contact 13 is guided to the internal space of the branch pipe 5, so that the heat dissipation is improved.

According to the present embodiment, for example, the branch pipe 16 is arranged on the lower portion of the metal container 1, and therefore it is possible to drop and capture the metal foreign matters that behave in the metal container 1 under the operation voltage in the branch pipe 16. Because the outer diameter of the shield 7 is larger than the outer diameter of the main circuit conductor 2 and the electric field is increased near the shield 7, the metal foreign matters behave actively and the metal foreign matters are likely to approach the shield 7, and therefore the arrangement of the branch pipe 16 on the lower portion is effective in capturing the metal foreign matters. Furthermore, the branch pipe 16 serves as an access hole for a visual check when connecting the main circuit conductor 2 to the contact 13, which improves the assembling workability and reliability.

In the present embodiment, the axis line of the main circuit conductor 2 and the axis line 3 are configured to match each other; however, the two lines can be arranged in an eccentric manner. For example, the main circuit conductor 2 can be arranged by being shifted downward from the axis line 3. In this case, as compared to the present embodiment, metal foreign matters that behave in the metal container 1 under the operation voltage are likely to be attached to the main circuit conductor 2 or the insulation spacer 6. That is, in the present embodiment, the reliability of the insulation performance is further improved.

It is preferred that the length of the shield 7 in the direction of the axis line 3 is shorter than the inner diameter of the branch pipe 16. With this configuration, the visibility is improved when the main circuit conductors 2 are connected while visually checking the connecting operation through the branch pipe 16. Other operations and effects of the present embodiment are as described above in the explanations of the configuration of the present embodiment.

Second Embodiment

Figure 6:
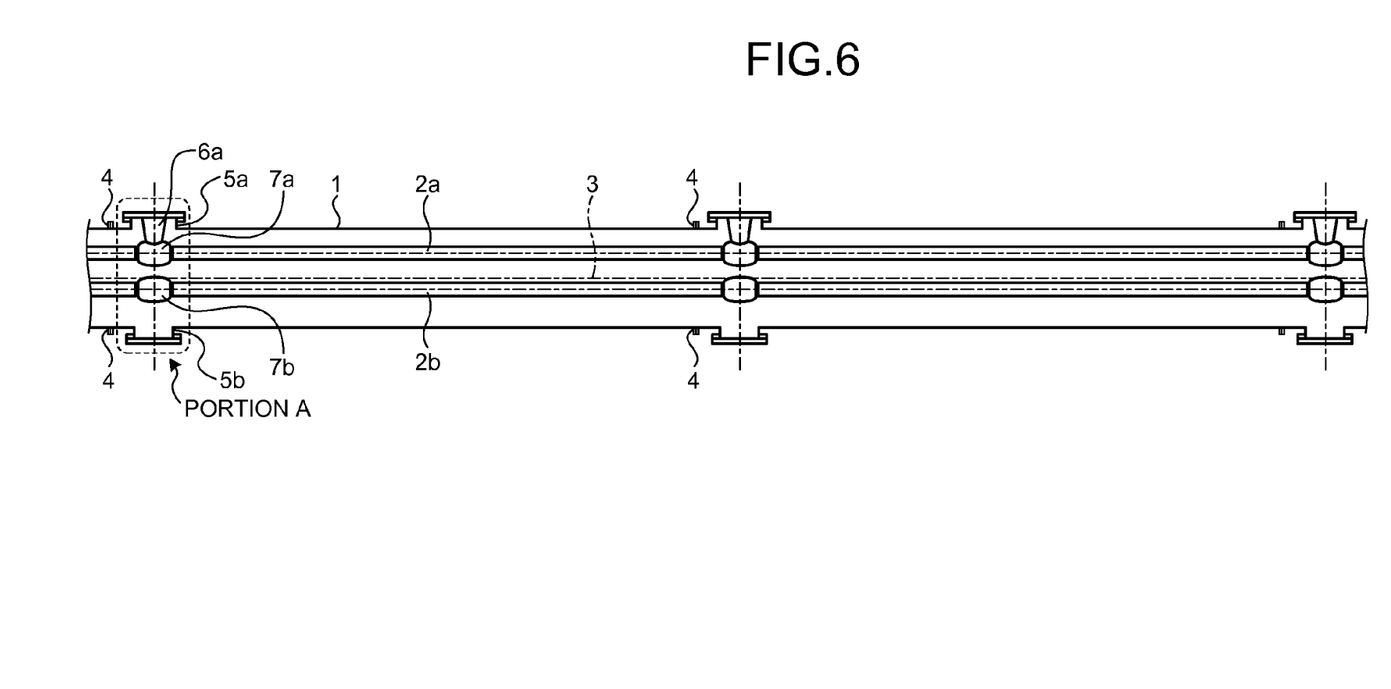
FIG. 6 is a longitudinal cross-sectional diagram of a gas-insulated bus bar according to a second embodiment.
Figure 7:
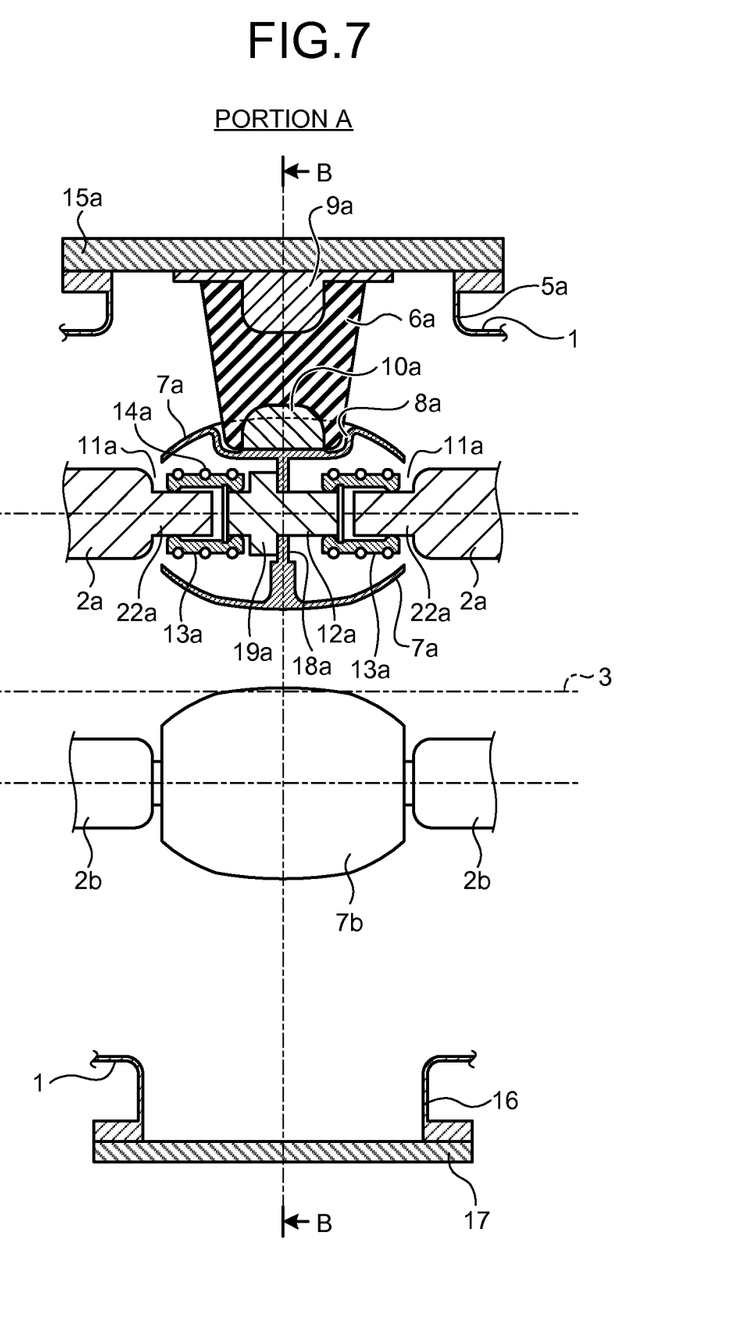
FIG. 7 is a detailed diagram of a portion A shown in FIG. 6.
Figure 8:
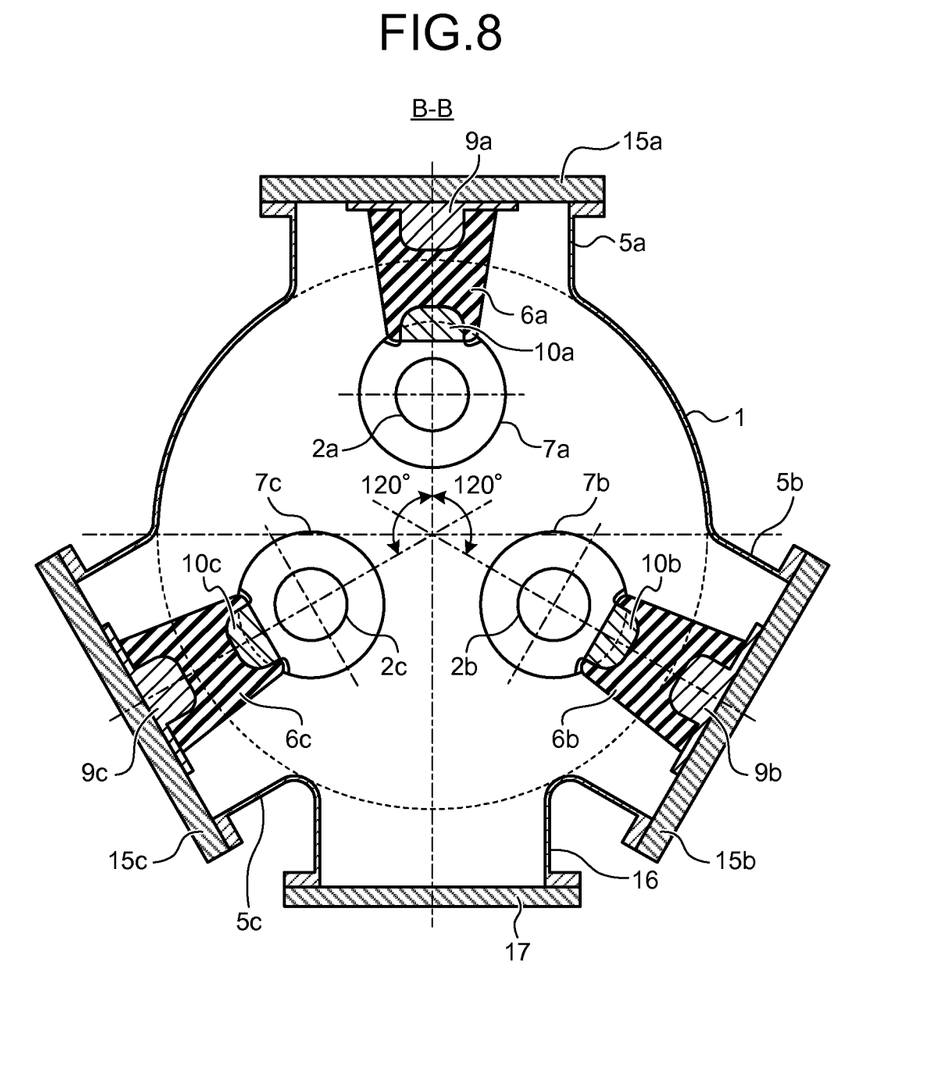
FIG. 8 is a cross-sectional diagram along a line B-B shown in FIG. 7.

FIG. 6 is a longitudinal cross-sectional diagram of a gas-insulated bus bar according to a second embodiment of the present invention, FIG. 7 is a detailed diagram of a portion A shown in FIG. 6, and FIG. 8 is a cross-sectional diagram along a line B-B shown in FIG. 7.

As shown in FIGS. 6 to 8, in the gas-insulated bus bar according to the present embodiment, for example, main circuit conductors 2a to 2c of three phases are collectively accommodated in the cylindrical metal container 1 filled with insulation gas such as sulfur hexafluoride ($SF_6$). The metal container 1 is arranged, for example, by setting horizontally the axis line 3, which is a center axis of the main cylindrical body. However, the metal container 1 can be arranged vertically or with an inclination. The main circuit conductors 2a to 2c are arranged to extend in parallel to the axis line 3. Each of the main circuit conductors 2a to 2c has a cross section of, for example, an annular shape of which an outer shape of the cross section is a circular shape.

The main circuit conductors 2a to 2c are respectively arranged at, for example, apexes of an equilateral triangle on a cross section perpendicular to the axis line 3 (see FIG. 8). That is, distances from the axis line 3 to center axes of the main circuit conductors 2a to 2c are equal to each other, and the directions of center axes respectively make an angle difference of 120 degrees. Furthermore, the main circuit conductor 2b and the main circuit conductor 2c are arranged, for example, at the same height, and the main circuit conductor 2a is arranged at an upper side than the main circuit conductors 2b and 2c. That is, an equilateral triangle defined by the arrangement of the main circuit conductors 2a to 2c is such that one side of the equilateral triangle is parallel to the horizontal direction and one apex is positioned above the one side. The main circuit conductors 2a to 2c are not necessarily to be arranged at positions of the apexes of the equilateral triangle, and, for example, the main circuit conductors 2a to 2c can be arranged at positions of apices of an isosceles triangle or other types of triangle. However, an equilateral triangle is most preferable in terms of the insulation performance.

On a side of the metal container 1, for example, branch pipes 5a to 5c and 16 are provided at a predetermined interval in the direction of the axis line 3. The branch pipe 5a is branched, for example, in an upward direction, the branch pipe 5b is branched, for example, in one lower diagonal direction making an angle of 120 degrees with respect to the branching direction of the branch pipe 5a, and the branch pipe 5c is branched, for example, the other lower diagonal direction making an angle of 120 degrees with the branching directions of the branch pipes 5a and 5b. The branch pipe 16 is branched, for example, in a downward direction. The branch pipes 5a, 5b, and 16 form, for example, branches of a circular shape, and are branched, for example, in directions substantially perpendicular to the direction of the axis line 3. Inner diameters of the branch pipes 5a to 5c are, for example, equal to each other.

An insulating support structure of the main circuit conductor 2a is described next. A lid 15a is attached to the branch pipe 5a by a bolt, for example, and an insulation spacer 6a is attached to the lid 15a. The insulation spacer 6a has, for example, a one-legged structure. An embedded electrode 9a, which is a metal-container-side embedded electrode, is embedded in one end portion of the insulation spacer 6a, and the embedded electrode 9a is fixed to the lid 15a by a bolt, for example. That is, the one end portion of the insulation spacer 6a is attached to the lid 15a, which is a portion of the metal container 1, via the embedded electrode 9a, and is arranged in the branch pipe 5a.

An inner diameter of the branch pipe 5a can be, for example, equal to or smaller than the inner diameter of the main cylindrical body of the metal container 1. Similarly, an inner diameter of the branch pipe 16 can be equal to or smaller than the inner diameter of the main cylindrical body of the metal container 1.

It is preferred that at least a portion of the embedded electrode 9a is located outside an area defined by the inner diameter of the main cylindrical body of the metal container 1 centering around the axis line 3.

An embedded electrode 10a, which is a shield-side embedded electrode, is embedded in the other end portion of the insulation spacer 6a. Furthermore, a shield 7a, which is substantially barrel-shaped and made of metal, is attached to the other end portion of the insulation spacer 6a via the embedded electrode 10a. Specifically, the shield 7a is fixed to the embedded electrode 10a by a bolt, for example. The shield 7a has a hollow structure through which the current conducting portion of the main circuit penetrates in the direction of the axis line 3, and includes an opening portion 11a on each of both ends in the direction of the axis line 3. An inner diameter of the opening portion 11a of the shield 7a is, for example, larger than the outer diameter of the main circuit conductor 2a. Further, an outer diameter of the shield 7a is larger than the outer diameter of the main circuit conductor 2a at any position in the direction of the axis line 3.

Furthermore, an annular portion 18a of an annular plate shape is provided at a substantially center portion of the shield 7a in the direction of the axis line 3 along an inner circumference of the shield 7a. An adaptor conductor 12a, which is formed, for example, in a substantially columnar shape, is inserted through the annular portion 18a, and the adaptor conductor 12a is fixed and supported by the annular portion 18a via a flange portion 19a that is a portion of the adaptor conductor 12a.

A concave portion 8a is formed on a portion of an outer surface of the shield 7a on a side of the branch pipe 5a. The other end portion of the insulation spacer 6a is arranged in the concave portion 8a, so that the insulation spacer 6a is arranged to be sandwiched by the shield 7a. In this case, at least a portion of the embedded electrode 10a is arranged in the concave portion 8a.

In the shield 7a, end portions 22a of the main circuit conductors 2a to be connected to each other are arranged so as to face each other. That is, the end portion 22a of the main circuit conductor on one side is inserted into the opening portion 11a of the shield 7a on the one side, and the end portion 22a of the main circuit conductor on the other side is inserted into the opening portion 11a of the shield 7a on the other side, the end portions 22a are arranged so as to face each other with a predetermined distance therebetween, and the adaptor conductor 12a is arranged between the end portions 22a. An outer shape of a cross section of the end portion 22a is, for example, a circular shape, and an outer diameter of the end portion 22a is, for example, smaller than the outer diameter of the other portion of the main circuit conductor 2a.

The end portion 22a of the main circuit conductor on the one side inserted into the opening portion 11a of the shield 7a on the one side is connected to one end portion of the adaptor conductor 12a via a contact 13a, and the end portion 22a of the main circuit conductor on the other side inserted into the opening portion 11a of the shield 7a on the other side is connected to the other end portion of the adaptor conductor 12a via another contact 13a. The contact 13a is a contact including a contact point with the main circuit conductor 2a being slidable in the direction of the axis line 3, and is for example, a tulip-shaped contact. In the example shown in the drawings, the contact 13a is configured with a plurality of contact pieces arranged in a circumferential direction and bundled by a garter spring 14a from the outer side. The end portion 22a is pressed and inserted into the contact 13a, and is electrically connected to the adaptor conductor 12a. Therefore, the end portions 22a facing each other are electrically connected to each other via, for example, the contact 13a and the adaptor conductor 12a. As described in the first embodiment, a configuration of connecting the end portions 22a without using the adaptor conductor 12a can also be used.

In this manner, the shield 7a supports the main circuit conductor 2a in the metal container 1 via the adaptor conductor 12a and the contact 13a. Furthermore, the shield 7a covers the end portion 22a of the main circuit conductor 2a.

The insulating support structure of the main circuit conductor 2a constituted of the insulation spacer 6a, the shield 7a, the adaptor conductor 12a, and the contact 13a described above is the same as the insulating support structure of the main circuit conductor 2 described in the first embodiment. Furthermore, the same structure is also applied to the main circuit conductors 2b and 2c. Although detailed explanations thereof are omitted, in FIGS. 6 to 8, an insulation spacer 6b that insulates and supports the main circuit conductor 2b, a shield 7b that is attached to the insulation spacer 6b, embedded electrodes 9b and 10b embedded in the insulation spacer 6b, the branch pipe 5b, and a lid 15b are shown, and an insulation spacer 6c that insulates and supports the main circuit conductor 2c, a shield 7c that is attached to the insulation spacer 6c, embedded electrodes 9c and 10c embedded in the insulation spacer 6c, the branch pipe 5c, and a lid 15c are also shown in the drawings.

The lid 17 is attached to the branch pipe 16 by a bolt, for example. The lid 17 seals the metal container 1. When assembling the gas-insulated bus bar, it is possible to visually check an operation of connecting the main circuit conductors 2 from outside the metal container 1 through the branch pipe 16 in a state of opening the lid 17. It is preferred that lengths of the shields 7a to 7c in the direction of the axis line 3 are shorter than the inner diameter of the branch pipe 16. This is because the visibility is improved when connecting the main circuit conductors 2, so that the reliability of the assembling operation is further improved. Furthermore, the branch pipe 16 is arranged, for example, below the shield 7a of the main circuit conductor 2a that is supported from the upper portion of the metal container 1.

According to the present embodiment, because the main circuit conductors 2a to 2c of three phases are collectively accommodated in the metal container 1, as compared to the configuration of the phase separation type described in the first embodiment, it is possible to reduce the number of the metal containers 1.

According to the present embodiment, because the arrangement of the main circuit conductors 2a to 2c of three phases in the metal container 1 is configured to form, for example, an equilateral triangle on the cross section perpendicular to the direction of the axis line 3, the distances between the main circuit conductors 2a to 2c are equal to each other, so that the insulation distance between the phases can be secured most effectively, and it is possible to mitigate an electromagnetic force at the time of short circuit between the phases.

According to the present embodiment, the arrangement of the main circuit conductors 2a to 2c of three phases in the metal container 1 is configured to define an equilateral triangle in the above manner, and the equilateral triangle is such that one side of the equilateral triangle is parallel to a horizontal direction and one apex of the equilateral triangle is positioned above the one side. Therefore, it is possible to separate as far as possible the main circuit conductors 2a to 2c from the lower portion of the metal container 1 where metal foreign matters are possibly accumulated, so that it is possible to suppress the behavior of the metal foreign matters under an operating voltage. In addition, the arrangement of the main circuit conductors 2a to 2c of three phases can be an equilateral triangle other than that described above or even other than an equilateral triangle.

According to the present embodiment, the branch pipe 16 is arranged below the shield 7a that covers the main circuit conductor 2a located at the apex of the equilateral triangle among the main circuit conductors 2a to 2c of three phases in the metal container 1. Therefore, it is possible to effectively capture metal foreign matters that behave in the metal container 1 under an operating voltage. Furthermore, the branch pipe 16 in a state of opening the lid 17 serves as an access hole for a visual check when connecting each of the main circuit conductors 2a to 2c, which improves the assembling workability and reliability.

According to the present embodiment, the length of each of the shields 7a to 7c in the direction of the axis line 3 is shorter than the inner diameter of the branch pipe 16, for example, and therefore the visibility is improved when the main circuit conductors 2a to 2c are connected while visually checking a connecting operation through the branch pipe 16.

Other configurations, operations, and effects of the present embodiment are identical to those of the first embodiment except for a feature applied to a case of the phase separation type, such as the relationship of the Equation (1).

As described above, the present invention is useful as a gas-insulated bus bar.

REFERENCE SIGNS LIST 1 metal container
2, 2a to 2c main circuit conductor
3 axis line
4 flange
5, 5a to 5c, 16 branch pipe
6, 6a to 6c insulation spacer
7, 7a to 7c, 27, 27b shield
8, 8a concave portion
9, 9a to 9c, 10, 10a to 10c embedded electrode
11, 11a opening portion
12, 12a adaptor conductor
13, 13a contact
14, 14a garter spring
15, 15a to 15c, 17 lid
18, 18a annular portion
19, 19a flange portion
22, 22a end portion
28 coil spring contact
29 area

The invention claimed is:

1. A gas-insulated bus bar comprising:
a cylindrical metal container that is arranged with insulation gas filled therein;
a pair of main circuit conductors that are accommodated in the metal container, extended in parallel to an axis line of a main body of the metal container, and have cross sections with a same circular outer shape;
an insulation spacer of a one-legged structure that is arranged in the metal container in a direction of the axis line of the main cylindrical body at a predetermined interval and includes one end portion attached to the metal container and the other end portion holding the pair of main circuit conductors in the metal container while electrically insulating the pair of main circuit conductors from the metal container, thereby supporting the pair of main circuit conductors in the metal container such that the pair of main circuit conductors is insulated from the metal container;
a branch pipe that is provided on a side of the metal container, arranged in the direction of the axis line at the predetermined interval corresponding to a place where the insulation spacer is arranged, and branched in a direction substantially perpendicular to the axis line, thereby including an inside portion where the one end portion of the insulation spacer is arranged;
a shield made of metal only and in which the pair of main circuit conductors are connected at their end portions, so that the shield covers connection portions of the pair of main circuit conductors, the shield is attached to the other end portion of the insulation spacer such that the end portions of the pair of main circuit conductors that are connected to the shield are located only at a location where the branch pipe is provided, has an outer diameter larger than an outer diameter of each of the pair of main circuit conductors and includes an inside portion into which the pair of main circuit conductors is inserted, and holds the pair of main circuit conductors in the metal container, the shield including an annular plate portion protruding from an inner surface the shield at a center portion of the shield; and an adaptor conductor having a flange portion that is directly fixed to the annular plate portion of the shield, and the adaptor conductor has a pair of contact bars on each opposing side, each contact bar extending in parallel to the axis line and having an end portion facing an end portion of one of the pair of main circuit conductors; and a pair of contact electrodes made of metal each of which covers and electrically contacts a contact portion between the end portion of one of the pair of main circuit conductors and the end portion of a corresponding one of the pair of contact bars, and each of which is slidable along the axis line of the main body of the metal container, wherein with a planar view from a direction parallel to a branching direction of the branch pipe, the insulation spacer and the shield have such respective sizes that are arranged within an area defined by an inner diameter of the branch pipe, the end portion of one of the pair of main circuit conductors is inserted into an opening of the shield on one side to face the end portion of one of the contact bars of the adaptor conductor in the direction of the axis line, and the end portion of the other one of the pair of main circuit conductors is inserted into another opening of the shield on the other side to face the end portion of the other contact bar of the adaptor conductor in the direction of the axis line.

2. The gas-insulated bus bar according to claim 1, wherein the inner diameter of the branch pipe is equal to or smaller than an inner diameter of the main body of the metal container.

3. The gas-insulated bus bar according to claim 1, wherein the shield includes a concave portion formed on a portion of an outer surface thereof, the insulation spacer includes a shield-side embedded electrode embedded in the other end portion, the other end portion of the insulation spacer is attached to the shield at the concave portion, and at least a portion of the shield-side embedded electrode is arranged inside the concave portion.

4. The gas-insulated bus bar according to claim 1, wherein the insulation spacer includes a metal-container-side embedded electrode embedded in one end portion thereof, and at least a portion of the metal-container-side embedded electrode is arranged outside an area defined by an inner diameter of the main body centering around the axis line.

5. The gas-insulated bus bar according to claim 1, wherein the end portion of one of the pair of main circuit conductors on the one side and the adaptor conductor are connected to each other by the contact portion on the one side, and the end portion of the other one of the pair of main circuit conductors on the other side and the adaptor conductor are connected to each other by the contact portion on the other side.

6. The gas-insulated bus bar according to claim 1, wherein a diameter of the end portion of the pair of main circuit conductors that is connected to the contact portion is smaller than a diameter of parts of the pair of main circuit conductors other than the end portion.

7. The gas-insulated bus bar according to claim 1, wherein a diameter of each opening portion of the shield is larger than the outer diameter of the pair of main circuit conductors.

8. The gas-insulated bus bar according to claim 1, wherein
the pair of main circuit conductors is arranged and accommodated in the metal container for a single phase, and
1/e (where e is a base of natural logarithm) times the inner diameter of the main body of the metal container is larger than the outer diameter of the pair of main circuit conductors and smaller than a maximum outer diameter of the shield.

9. The gas-insulated bus bar according to claim 1, wherein the metal container is arranged such that a longitudinal direction thereof is set horizontally.

10. The gas-insulated bus bar according to claim 9, wherein the insulation spacer supports the shield from an upper portion of the metal container.

11. The gas-insulated bus bar according to claim 9, wherein a lower branch pipe that is different from the branch pipe is provided on a side of the metal container in a downward direction of the shield.

12. The gas-insulated bus bar according to claim 1, wherein the pair of main circuit conductors of three phases are collectively accommodated in the metal container.

13. The gas-insulated bus bar according to claim 12, wherein an arrangement of the pair of main circuit conductors of three phases in the metal container defines an equilateral triangle on a cross section perpendicular to the axis line.

14. The gas-insulated bus bar according to claim 13, wherein the arrangement of the pair of main circuit conductors of three phases in the metal container defines the equilateral triangle such that one side of the equilateral triangle is parallel to a horizontal direction and an apex of the equilateral triangle is positioned above the one side.

15. The gas-insulated bus bar according to claim 14, wherein a lower branch pipe that is different from the branch pipe is provided on a side of the metal container in a downward direction of the shield that covers the pair of main circuit conductors arranged at a highest position among the pair of main circuit conductors of three phases in the metal container.

16. The gas-insulated bus bar according to claim 11, wherein a length of the shield in the direction of the axis line is shorter than an inner diameter of the lower branch pipe.

17. The gas-insulated bus bar according to claim 15, wherein a length of the shield in the direction of the axis line is shorter than an inner diameter of the lower branch pipe.

18. The gas-insulated bus bar according to claim 1, wherein the shield is substantially barrel-shaped, and each end portion of the pair of main circuit conductors is connected in the shield.

* * * * *